United States Patent
Yokoi et al.

(10) Patent No.: US 12,269,082 B2
(45) Date of Patent: Apr. 8, 2025

(54) WIPING UNIT AND CAN BODY MAKER

(71) Applicant: TOYO SEIKAN CO., LTD., Tokyo (JP)

(72) Inventors: Tomohito Yokoi, Kanagawa (JP); Hiromitsu Funatsuki, Kanagawa (JP); Kyouichi Kangawa, Kanagawa (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 79 days.

(21) Appl. No.: 18/342,970

(22) Filed: Jun. 28, 2023

(65) Prior Publication Data

US 2023/0341054 A1   Oct. 26, 2023

Related U.S. Application Data

(63) Continuation of application No. PCT/JP2022/003260, filed on Jan. 28, 2022.

(30) Foreign Application Priority Data

Feb. 12, 2021   (JP) .................. 2021-020967

(51) Int. Cl.
- *F16J 15/18*   (2006.01)
- *B21D 22/28*   (2006.01)
- *B21D 51/26*   (2006.01)
- *F04B 39/04*   (2006.01)

(52) U.S. Cl.
CPC .......... *B21D 22/286* (2013.01); *B21D 51/26* (2013.01); *F16J 15/18* (2013.01); *F04B 39/041* (2013.01)

(58) Field of Classification Search
CPC .................. F16J 15/18; F16J 15/182
See application file for complete search history.

(56) References Cited

U.S. PATENT DOCUMENTS

| | | | | |
|---|---|---|---|---|
| 3,360,272 | A | * | 12/1967 | Blom ............... F16J 15/3404 277/927 |
| 3,829,104 | A | * | 8/1974 | Green ............... B60T 11/236 277/552 |
| 4,222,575 | A | * | 9/1980 | Sekiguchi ......... F02G 1/0535 277/516 |
| 4,819,952 | A | * | 4/1989 | Edlund ............. F16J 15/3232 277/556 |

(Continued)

FOREIGN PATENT DOCUMENTS

| | | |
|---|---|---|
| EP | 3504437 B1 | 8/2020 |
| JP | 50-74644 A | 6/1975 |

(Continued)

OTHER PUBLICATIONS

English Translation of ISR cited in corresponding International Appln. No. PCT/JP2022/003260 dated Mar. 23, 2022.

*Primary Examiner* — Vishal A Patel
(74) *Attorney, Agent, or Firm* — BACON & THOMAS, PLLC

(57) ABSTRACT

A wiping unit for a reciprocating ram includes a subunit including: a ring-shaped wipe member including a lip to press an outer peripheral surface of the ram; and an elastic ring disposed on an outer circumference of the wipe member and configured to press the lip on the outer peripheral surface of the ram. The wipe member is made of rigid resin.

5 Claims, 8 Drawing Sheets

(56) References Cited

U.S. PATENT DOCUMENTS

| | | | | |
|---|---|---|---|---|
| 5,149,107 A | * | 9/1992 | Maringer | F16J 15/3208 |
| | | | | 277/560 |
| 5,687,605 A | | 11/1997 | Main | |
| 6,293,558 B1 | * | 9/2001 | Crapart | F16J 15/3252 |
| | | | | 277/572 |
| 6,827,351 B2 | * | 12/2004 | Graziani | F04B 39/041 |
| | | | | 277/552 |
| 7,125,020 B2 | * | 10/2006 | LeClair, Jr. | F04C 2/106 |
| | | | | 277/572 |
| 2019/0201962 A1 | | 7/2019 | Butcher | |
| 2020/0386218 A1 | | 12/2020 | Feistel | |

FOREIGN PATENT DOCUMENTS

| | | |
|---|---|---|
| JP | 7-185683 A | 7/1995 |
| JP | 2512274 B2 | 7/1996 |
| JP | 2000-190032 A | 7/2000 |
| JP | 2019-528397 A | 10/2019 |
| JP | 2020-523200 A | 8/2020 |

* cited by examiner

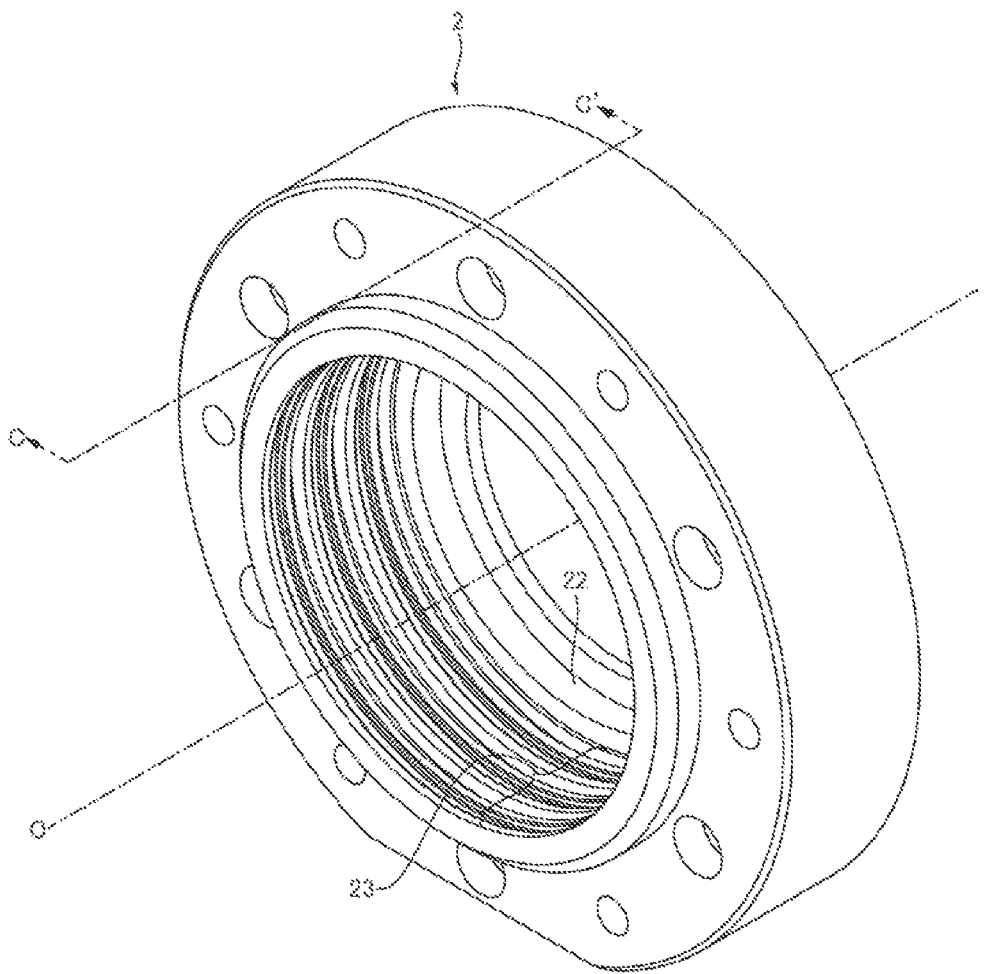
FIG. 3

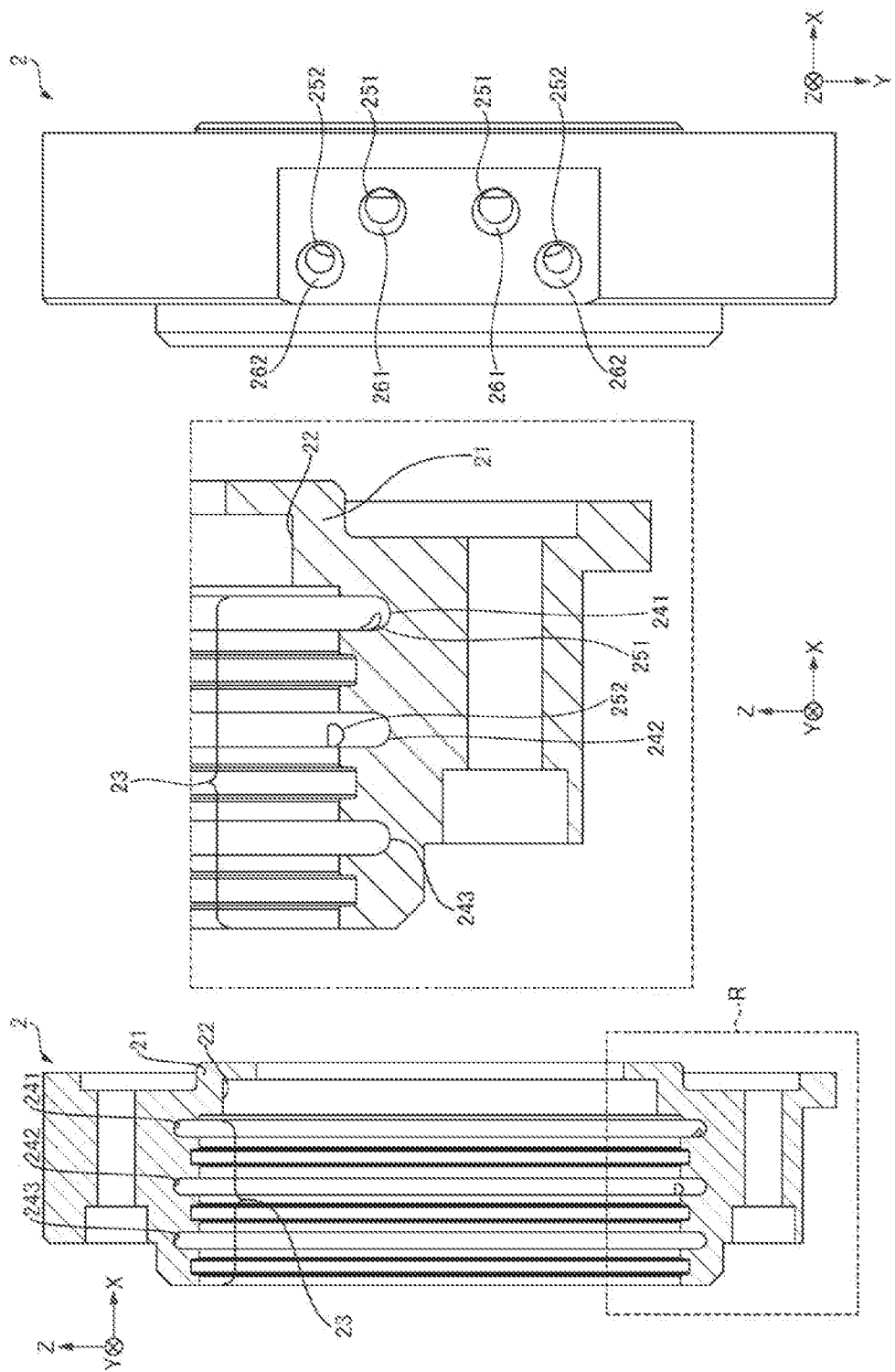

WIPING UNIT AND CAN BODY MAKER

CROSS-REFERENCE TO RELATED APPLICATIONS

The present application is a continuation application of PCT International Application No. PCT/JP 2022/003260 filed on Jan. 28, 2022 which claims priority from Japanese Patent Application No. 2021-020967 filed on Feb. 12, 2021, and the entire contents of each of the applications are hereby incorporated by reference.

BACKGROUND

1. Technical Field

The present invention relates to a wiping unit, and a can body maker including the wiping unit.

2. Related Art

Conventionally, there has been a can body maker configured to mold a can body such as a beverage can. Generally, a can body maker includes a cylindrical ram reciprocating along its central axis direction, and performs drawing process by pressing the front end of the ram against the inner bottom surface of a cup body made of metal to mold a cylindrical can from the cup body. See, for example, Japanese Patent Application Laid-Open No. 2020-523200. The entire contents of this disclosure are hereby incorporated by reference.

In many cases, this sort of can body maker includes a wiping unit configured to press the outer peripheral surface of the reciprocating ram. While the ram is reciprocating, a wiping member of the wiping unit wipes a fat-soluble lubricant used in a drive mechanism to drive the reciprocating motion of the ram, from the outer peripheral surface of the ram. By this means, the can body maker prevents mixing of the fat-soluble lubricant and a water-soluble lubricant (coolant) supplied to the ram for molding a can.

As the structure of the wiping member, there have been generally known, for example, a wiper ring described in Japanese translation of PCT application No. 2019-528397 and a seal ring described in Japanese Patent No. 2512274. The wiper ring described in Japanese translation of PCT application No. 2019-528397 includes a holder provided in a chamber disc via a peripheral spring, and a wiper blade held by the holder. This wiper ring is configured to wipe the oil on the surface of a piston rod with the blade tip of the wiper blade. The entire contents of these disclosures are hereby incorporated by reference.

Japanese Patent No. 2512274 describes that the seal ring used as a packing to seal the gap between a reciprocating rod and a casing to surround the rod includes a seal lip contacting the rod.

Each of the blade tip of the wiper ring described in Japanese translation of PCT application No. 2019-528397, and the tip of the seal lip of the seal ring described in Japanese Patent No. 2512274 is a lip having a blade-like cross section.

SUMMARY

The wiping unit according to the invention is a wiping unit for a reciprocating ram including a subunit including: a ring-shaped wipe member including a lip to press an outer peripheral surface of the ram; and an elastic ring disposed on an outer circumference of the wipe member and configured to press the lip on the outer peripheral surface of the ram. The wipe member is made of rigid resin.

BRIEF DESCRIPTION OF THE DRAWINGS

FIG. 3 is a perspective view illustrating a housing;

FIG. 4A is a C-C' line cross-sectional view illustrating the housing of FIG. 3;

FIG. 4B is an enlarged view illustrating region R of FIG. 4A;

FIG. 4C is a bottom view illustrating the housing;

DETAILED DESCRIPTION

As the ram of the can body maker, a ram reciprocating at a relatively high speed and a long stroke is elongate. Accordingly, when reciprocating, the ram is undesirably swung in not only the central axis direction but also the circumferential direction of the ram due to various disturbance factors. Therefore, if the wiping unit mounted to the ram reciprocating as described above includes the wipe member having the structure as the scraper ring described in Japanese translation of PCT application No. 2019-528397 or the seal ring described in Japanese Patent No. 2512274, the blade-like lip of the wipe member is unevenly pressed on the outer peripheral surface of the ram, and consequently unevenly worn. This causes a problem of making it difficult for this wiping unit to fully maintain its function for a long time.

The present invention has been achieved considering the above-described circumstances to address the above-described problems. It is therefore an aspect of the object of the invention to provide a wiping unit capable of fully maintaining its function for a long time, and a can body maker including the wiping unit.

Hereinafter, an embodiment of the invention (present embodiment) will be described with reference to the drawings.

<Appearance of Wiping Unit>

Figure 1:
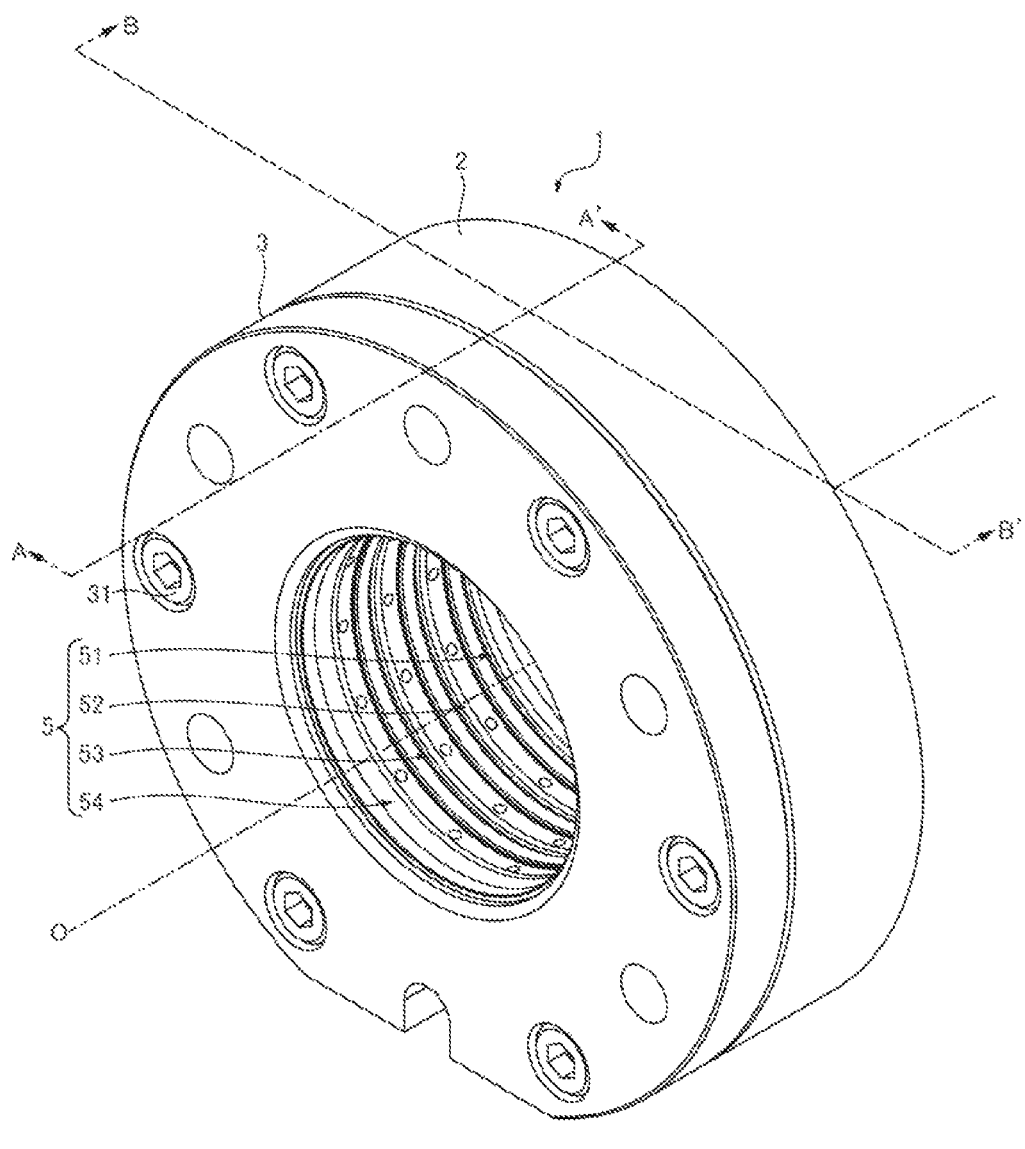
FIG. 1 is a perspective view illustrating a wiping unit according to an embodiment.

A wiping unit 1 according to the present embodiment illustrated in FIG. 1 is an ring-shaped wiping unit for a reciprocating ram, and includes an ring-shaped housing 2, and an ring-shaped cap 3 attached to the housing 2. The cap 3 is detachably attached to the housing 2. The wiping unit 1 is closed with the cap 3 by attaching the cap 3 to the housing 2 with a plurality of screw members 31. In this wiping unit 1, four ring-shaped subunits 5 (subunits 51 to 54) are arranged along the direction of a central axis O of the wiping unit 1 along the longitudinal direction of a ram 201 (see FIG. 7) (that is, the central axis direction of the ram 201). Here, as illustrated in FIG. 1 to FIG. 3, FIG. 5, FIG. 6, and FIG. 8, "ring shape" means "approximately circular shape", but this is by no means limiting. With the present embodiment, "ring shape" may be other ring shapes such as "approximately elliptical ring shape."

<Can Body Maker>

The wiping unit 1 is mounted to the cylindrical ram 201 provided in a can body maker configured to mold a can body of, for example, a beverage can. To be more specific, the ring-shaped wiping unit 1 is configured such that a wiping member 6 presses an outer peripheral surface 201a of the ram 201 inserted in the hollow of the wiping unit 1. In the can body maker, while a water-soluble lubricant (coolant) is supplied to the outer peripheral surface 201a of the ram 201, the ram 201 reciprocates in its central axis direction to apply drawing and ironing process to a cup body made of metal thereby to mold a cylindrical can from the cup body. In this case, the ram 201 is driven while lubricating oil is supplied to a drive mechanism to drive the reciprocating motion of the ram 201 in the can body maker.

In the can body maker, the wiping unit 1 is disposed on the boundary between a side where a water-soluble lubricant for molding a can is supplied to the outer peripheral surface 201a of the ram 201 and a drive mechanism side where the reciprocating motion of the ram 201 is driven by suppling lubricating oil. In the can body maker, the wiping unit 1 disposed as described above prevents mixing of the water-soluble lubricant and the lubricating oil (see Japanese Patent Application Laid-Open No. 2020-523200).

The water-soluble lubricant is made of water containing a small amount of soluble oil, and, for example, may contain the soluble oil of 2 to 4% of the whole water-soluble lubricant, and the rest may be water.

The lubricating oil may be fat-soluble oil made by adding an oil additive suitable to lubricate the bearing and the drive mechanism of the ram 201 to base oil which is, for example, mineral oil or chemical oil.

The operating conditions of the can body maker is not particularly limited, but the ram 201 may reciprocate at a high speed. For example, the can body maker is operated at a ram stroke of 24 to 27 inches, a can manufacturing speed of 400 cans/min (minute), and the maximum ram stroke speed of 12 m/s (second).

<Detailed Configuration of Wiping Unit>

Figure 2B:
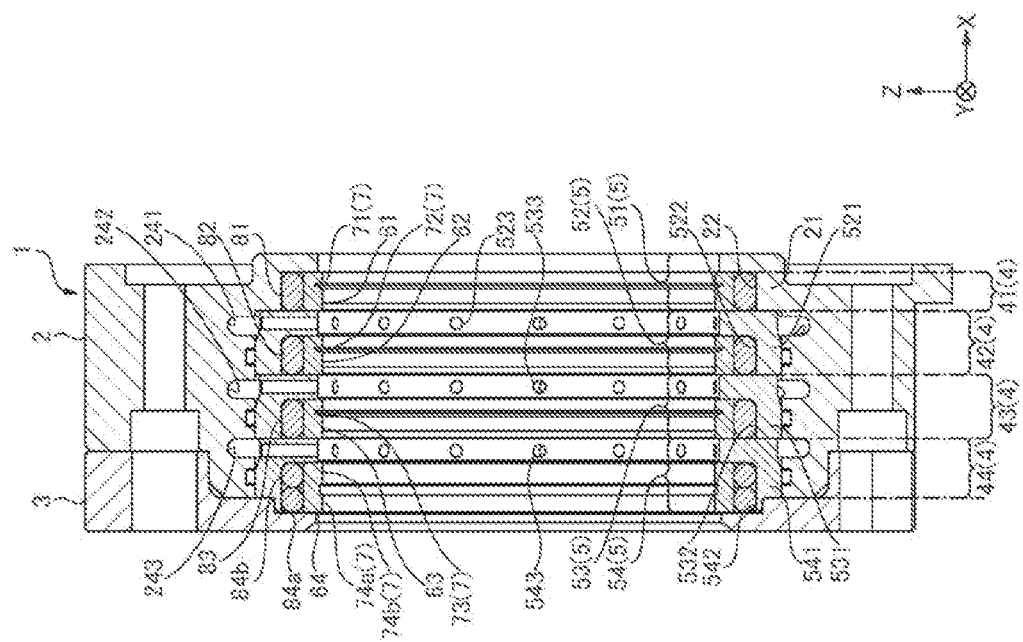
FIG. 2B is an A-A' line cross-sectional view of FIG. 2A.
Figure 2A:
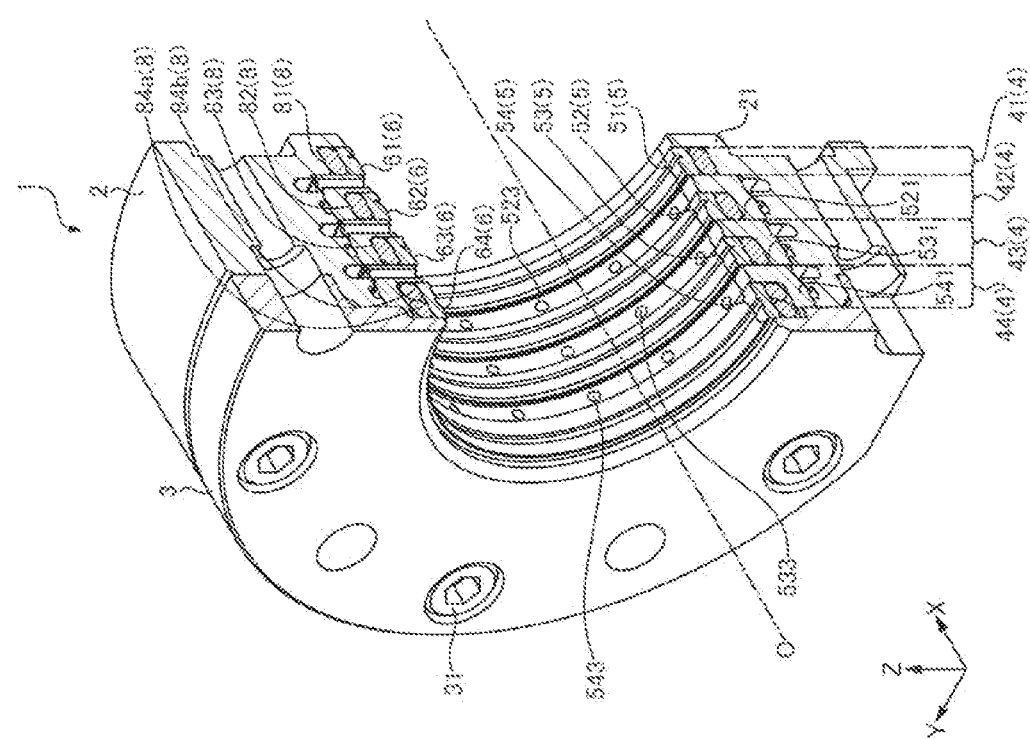
FIG. 2A is a perspective view illustrating the wiping unit illustrated in FIG. 1 taken along line A-A'.

As illustrated in FIGS. 2A and 2B, in the wiping unit 1, the cap 3 is attached to the ring-shaped housing 2 including the four ring-shaped subunits 5 (subunits 51 to 54) with a plurality of screw members 31 to close the housing 2 with the cap 3.

As illustrated in FIGS. 2A and 2B, FIG. 3, and FIG. 4A, the housing 2 includes a frame 21 including a storage stage 22 configured to store a wipe member 61 and an elastic ring 81 inserted from one side of the direction of the central axis O (from the opposite side of X-axis direction indicated by an arrow) along the longitudinal direction of the ram 201. The ring-shaped wipe member 61 and elastic ring 81 are stored in the storage stage 22 of the ring-shaped frame 21 to form a ring-shaped subunit 51. In addition, ring-shaped wipe member 62 and elastic ring 82 are stored in a storage stage 522 of a ring-shaped frame 521 to form a ring-shaped subunit 52. Likewise, ring-shaped wipe member 63 and elastic ring 83 are stored in a storage stage 532 of a ring-shaped frame 531 to form a ring-shaped subunit 53, and ring-shaped wipe member 64 and elastic rings 84a and 84b are stored in a storage stage 542 of a ring-shaped frame 541 to form a ring-shaped subunit 54.

As illustrated in FIGS. 3, 4A and 4B, the housing 2 includes a frame storage 23 configured to store the stacked frames 521, 531, and 541 of the subunits 52 to 54.

Figure 5B:
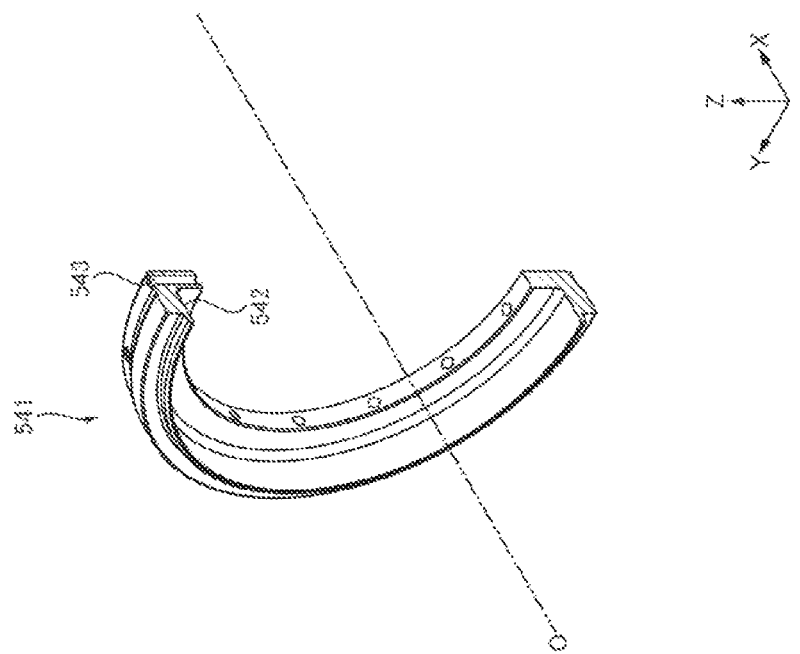
FIG. 5B is a perspective view illustrating the frame of FIG. 5A taken along line D-D'.
Figure 5A:
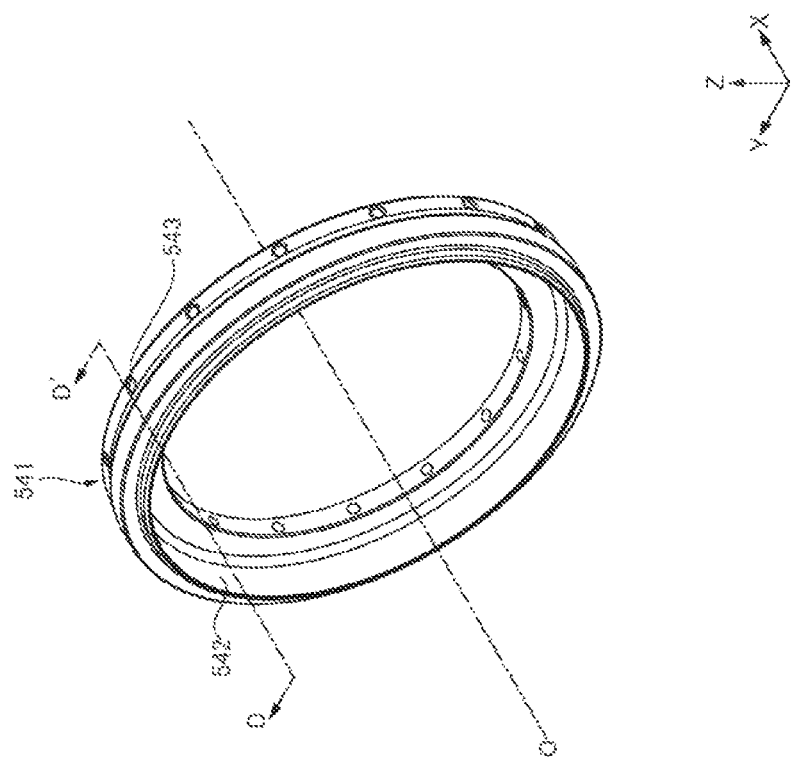
FIG. 5A is a perspective view illustrating a frame.

The frames 521, 531, and 541 will be described using the frame 541 illustrated in FIGS. 5A and 5B as an example. The frame 541 includes the storage stage 542 configured to store the wipe member 64, and the two elastic rings 84a and 84b disposed on the outer circumference of the wipe member 64 inserted from one side of the direction of the central axis O (from the direction opposite to the X-axis direction indicated by the arrow). In addition, the frame 541 includes a plurality of drain holes 543 provided radially with respect to the central axis O. Here, the number of the drain holes 543 is not particularly limited, but one is possible, or two or more is possible.

The frames 521 and 531 may have approximately the same configuration as the frame 541. As illustrated in FIGS. 2A and 2B, the storage stage 522 of the frame 521 stores the wipe member 62 and the elastic ring 82 disposed on the outer circumference of the wipe member 62 inserted from one side of the direction of the central axis O (from the direction opposite to the X-axis direction indicated by the arrow). The frame 521 includes a plurality of drain holes 523 provided radially with respect to the central axis O. In addition, the storage stage 532 of the frame 531 stores the wipe member 63 and the elastic ring 83 disposed on the outer circumference of the wipe member 63 inserted from one side of the direction of the central axis O (from the direction opposite to the X-axis direction indicated by the arrow). A plurality of drain holes 533 are provided radially with respect to the central axis O in the frame 531.

As illustrated in FIG. 2B and FIG. 4A, ring-shaped drain grooves 241, 242, and 243 communicating with the drain holes 523, 533, and 543, respectively, are provided inside the frame storage 23 of the housing 2. Details of the drain grooves 241, 242 and 243 will be described later.

Figure 6:
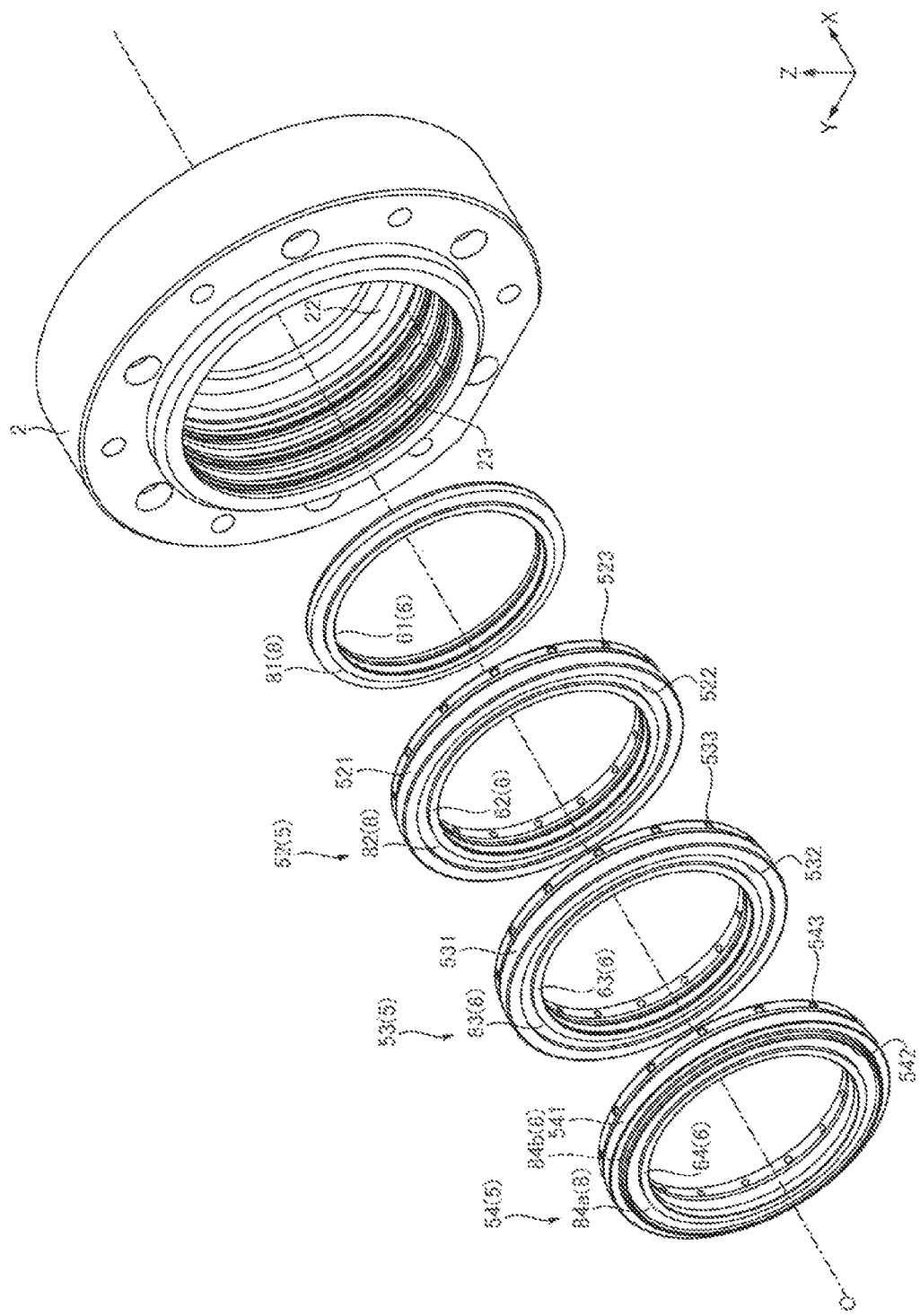
FIG. 6 is a perspective view illustrating the housing, wipe members, elastic rings, and a plurality of subunits, which are taken apart.

As illustrated in FIG. 6, the ring-shaped housing 2 stores the wipe members 61 to 64, the elastic rings 81 to 83, 84a and 84b disposed on the outer circumference of the wipe members 61 to 64, and the frames 521, 531, and 541 inserted from one side of the direction of the central axis O (from the direction opposite to the X-axis direction indicated by the arrow). To be more specific, as illustrated in FIGS. 2A and 2B, FIG. 4A, and FIG. 6, first the ring-shaped wipe members 61 and the ring-shaped elastic ring 81 are inserted in the storage stage 22 of the frame 21 of the housing 2 from one side of the direction of the central axis O (from the direction opposite to the X-axis direction indicated by the arrow) of the housing 2, thereby to form the subunit 51.

Next, the subunit 52, that is, the frame 521 in which the ring-shaped wipe member 62 and the ring-shaped elastic ring 82 disposed on the outer circumference of the wipe member 62 are inserted from the one side of the direction of the central axis O (from the direction opposite to the X-axis direction indicated by the arrow) is inserted in the frame storage 23 of the housing 2 from the one side of the direction of the central axis O (from the direction opposite to the X-axis direction indicated by the arrow).

Next, the subunit 53, that is, the frame 531 in which the ring-shaped wipe member 63 and the ring-shaped elastic ring 83 disposed on the outer circumference of the wipe member 63 are inserted from the one side of the direction of the central axis O (from the direction opposite to the X-axis direction indicated by the arrow) is inserted in the frame storage 23 of the housing 2 from the one side of the direction of the central axis O (from the direction opposite to the X-axis direction indicated by the arrow). After that, the subunit 54, that is, the frame 541 in which the ring-shaped wipe member 64 and the two ring-shaped elastic rings 84a and 84b disposed on the outer circumference of the wipe member 64 are inserted from the one side of the direction of the central axis O (from the direction opposite to the X-axis direction indicated by the arrow) is inserted in the frame storage 23 of the housing 2 from the one side of the direction of the central axis O (from the direction opposite to the X-axis direction indicated by the arrow).

Here, the ring-shaped elastic ring 81 and the ring-shaped wipe member 61 are stored in the storage stage 22 of the frame 21 of the housing 2 while keeping their ring shape. In addition, the ring-shaped elastic ring 82 and the ring-shaped wipe member 62 are stored in the frame 521 while keeping their ring shape. Moreover, the ring-shaped elastic ring 83 and the ring-shaped wipe member 63 are stored in the frame 531 while keeping their ring shape. Furthermore, the ring-shaped elastic rings 84a and 84b, and the ring-shaped wipe member 64 are stored in the frame 541 while keeping their ring shape. In this way, the wipe members 61 to 64 are stored while keeping their ring shape without being deformed, and therefore it can make it easy to store them for replacement.

As described above, in the housing 2, the wipe member 61 and the elastic ring 81 are stored in the storage stage 22 of the frame 21 to form the subunit 51, and then, the frames 521, 531 and 541 of the subunits 52 to 54 are stacked and stored in the frame storage 23, as illustrated in FIGS. 2A and 2B, FIG. 3, and FIG. 4A.

In this state, the ring-shaped cap 3 is fixed to the housing 2 with the plurality of screw members 31, so that the frame storage 23 is closed with the ring-shaped cap 3. By this means, the wiping unit 1 illustrated in FIG. 1 and FIGS. 2A and B is formed.

As illustrated in FIGS. 2A and 2B, the subunits 51 to 54 are arranged in the wiping unit 1 along the direction of the central axis O. In the wiping unit 1, the subunits 51 to 54 are arranged in this way to form a wipe section 4 (wipe sections 41-44) where the wipe members 61 to 64 scrape the lubricating oil and the scraped lubricating oil is discharged.

<Wipe Member and Elastic Ring>

Figure 7A:
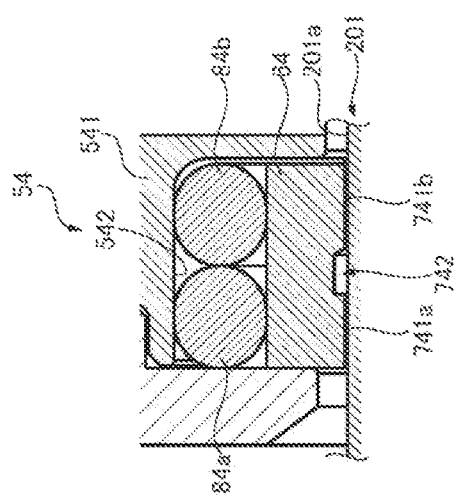
FIGS. 7A and 7B are partial cross-sectional views illustrating the subunit including the frame in which the wipe member and the elastic rings illustrated in FIG. 2B are stored.
Figure 7B:
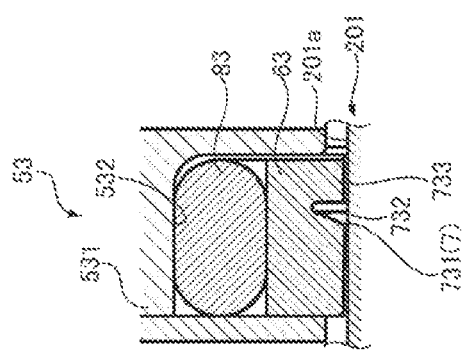

Next, the wipe member 6 (wipe members 61 to 64) and the elastic ring 8 (elastic rings 81 to 83, 84a and 84b) will be described. FIG. 7A is a partial cross-sectional view illustrating the wipe member 64 and the elastic rings 84a and 84b stored in the frame 541 of the subunit 54 illustrated in FIG. 2B. FIG. 7B is a partial cross-sectional view illustrating the wipe member 63 and the elastic ring 83 stored in the frame 531 of the subunit 53 illustrated in FIG. 2B. Here, as illustrated in FIGS. 2A and 2B, the wipe member 61 and the elastic ring 81 of the subunit 51, and the wipe member 62 and the elastic ring 82 of the subunit 52 have the same configurations of those of the wipe member 63 and the elastic ring 83 of the subunit 63, and therefore are not illustrated and described in detail.

As illustrated in FIG. 7B, the wipe member 63 of the subunit 53 includes a lip 731, a groove 732, and a posture keeper 733. For example, when the can body maker manufactures a beverage can as a 211 body-diameter can (whose diameter of the cylindrical part is about 66 mm) which is the most widely distributed in the market, the lip 731 has an interference of 0.3 to 0.6 mm, that is, the difference in radius from the outer peripheral surface 201a of the ram 201. The elastic ring 83 of the subunit 53 is sandwiched between the storage stage 532 of the frame 531 and the wipe member 63, and stored. By this means, pressing force (strain force) is applied to the wipe member 63, and therefore the lip 731 of the wipe member 63 elastically presses the outer peripheral surface 201a of the ram 201 reciprocating along the central axis direction (the X-axis direction and the opposite direction thereof), and consequently always follows the ram 201 and scrapes the lubricating oil on the outer peripheral surface 201a of the ram 201.

Most of the lubricating oil scraped by the wipe member 63 stays in the groove 732 once, but flows through the gap between the posture keeper 733 and the outer peripheral surface 201a of the ram 201, flows into the ring-shaped drain groove 242 from the drain holes 533, and then is discharged to the outside, and consequently collected as a collected material. In addition, when the lubricating oil is scraped by the wipe member 63, part of the lubricating oil flows through the gap between the wipe member 63 and the frame 531, and flows into the outer peripheral surface side of the wipe member 63. The flowing lubricating oil generates an oil pressure to further increase the pressing force (strain force) applied from the lip 731 of the wipe member 63 to the outer peripheral surface 201a of the ram 201, and by this means, the lubricating oil is more surely scraped.

As described above, the wipe member 61 and the elastic ring 81 of the subunit 51, and the wipe member 62 and the elastic ring 82 of the subunit 52 have the same configurations as those of the wipe member 63 and the elastic ring 83 of the subunit 53. Therefore, also in the wipe sections 41 and 42 of the wiping unit 1, the lips 7 of the wipe members 61 and 62 scrape the lubricating oil on the outer peripheral surface 201a of the ram 201, when the ram 201 travels in the direction opposite to the X-axis direction.

As illustrated in FIG. 7A, the subunit 54 basically has the same configuration as those of the subunits 51 to 53. However, the wipe member 64 of the subunit 54 includes two lips 741a and 741b, and a groove 742. In the can body maker, the subunit 54 is located on the side where the water-soluble lubricant (coolant) for molding a can is supplied to the outer peripheral surface 201a of the ram 201. Therefore, the subunit 54 needs to prevent the water-soluble lubricant (coolant) and dust such as metal powder generated by molding the can from invading the drive mechanism side where the lubricating oil is supplied to drive the reciprocating motion of the ram 201.

Therefore, the wipe member 64 of the subunit 54 includes the planar lips 741a and 741b to press the outer peripheral surface 201a of the ram 201 by the faces of the lips 741a and 741b. The planar lip 741a of the wipe member 64 prevents the water-soluble lubricant (coolant) for molding a can and dust such as metal powder generated by molding the can from invading the groove 742 side beyond the lip 741a. In addition, even if the water-soluble lubricant and the dust invade the groove 742, the planer lip 741b prevents them from going over the lip 741b. In addition, the lip 741b of the wipe member 64 can scrape the lubricant oil on the outer peripheral surface 201a of the ram 201.

The subunit 54 includes these two planar lips 741a and 741b. Therefore, the subunit 54 includes the two elastic rings 84a and 84b on the outer circumference of the wipe member 64 to press the planar lips 741a and 741b, respectively, on the outer peripheral surface 201a of the ram 201. The wipe member 64 includes the groove 742, and therefore has the size and the shape that allow the pressing force (strain force) of the two elastic rings 84a and 84b to be sufficiently applied to the wipe member 64.

The elastic rings 84a and 84b are also pressed by the storage stage 524 of the frame 541. By this means, the elastic rings 84a and 84b apply a pressing force (strain force) to the wipe member 64. This pressing force causes the lips 741*a* and 741*b* of the wipe member 64 to elastically press the outer peripheral surface 201*a* of the ram 201 reciprocating along the central axis direction. By this means, the wipe member 64 follows the ram 201, and the lip 741*b* scrapes the water-soluble lubricant and the lubricating oil on the outer peripheral surface 201*a* of the ram 201, in the wipe section 44 of the wiping unit 1.

The wipe member 6 (wipe members 61 to 64) may be made of rigid resin. This rigid resin is not particularly limited, but, for example, rigid polyurethane, polyacetal (POM), ultrahigh molecular weight polyethylene (UHMW), and polytetrafluoroethylene (PTFE) are possible because of having sufficient hardness, and smoothness (low friction).

The wipe member 6 is made of this rigid resin, and the elastic ring 8 is disposed on the outer peripheral surface of the wipe member 6. Therefore, when the ram 201 reciprocates at a high speed (for example, the ram stroke of 24 to 27 inches, a can manufacturing speed of 400 cans/min (minute), and the maximum ram stroke speed of 12 m/s (second)) along its central axis direction, even though the ram 201 is shaken, the wipe member 6 follows the outer peripheral surface 201*a* of the ram 201 and presses the ram 201 evenly in the circumferential direction. Consequently, it is possible to surely scrape the lubricating oil and reduce uneven wear. In addition, the wipe member 6 is made of the rigid resin, and therefore has better wear resistance and deterioration resistance than a wipe member made of elastomer, and consequently can fully maintain its function for a long time.

The elastic ring 8 is referred to as a so-called "O ring", and its material is not particularly limited, but may be rubber which is generally used.

The wiping unit 1 including the wipe member 6 and the elastic ring 8 described above can fully maintain its function for a long time without frequently replacing the wipe member 6 and the elastic ring 8.

Here, the configurations of the wipe member 6 (wipe members 61 to 64) and the elastic ring (elastic rings 81 to 83, 84*a* and 84*b*) are not limited to the above-described embodiment, but other configurations are possible.

<Drain Path>

Figure 8B:
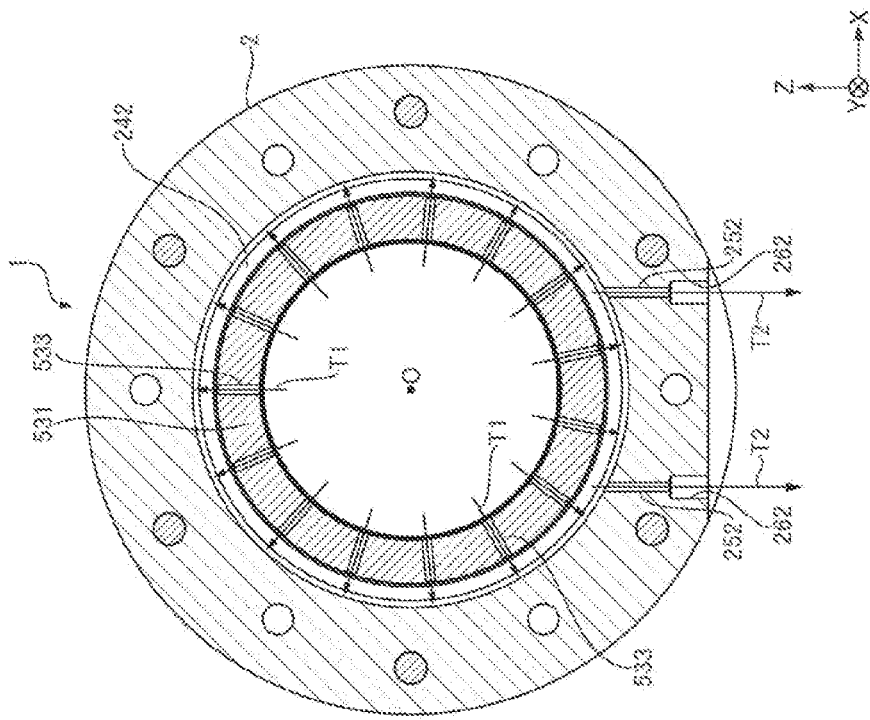
FIG. 8B is a B-B' line cross-sectional view of FIG. 8A.
Figure 8A:
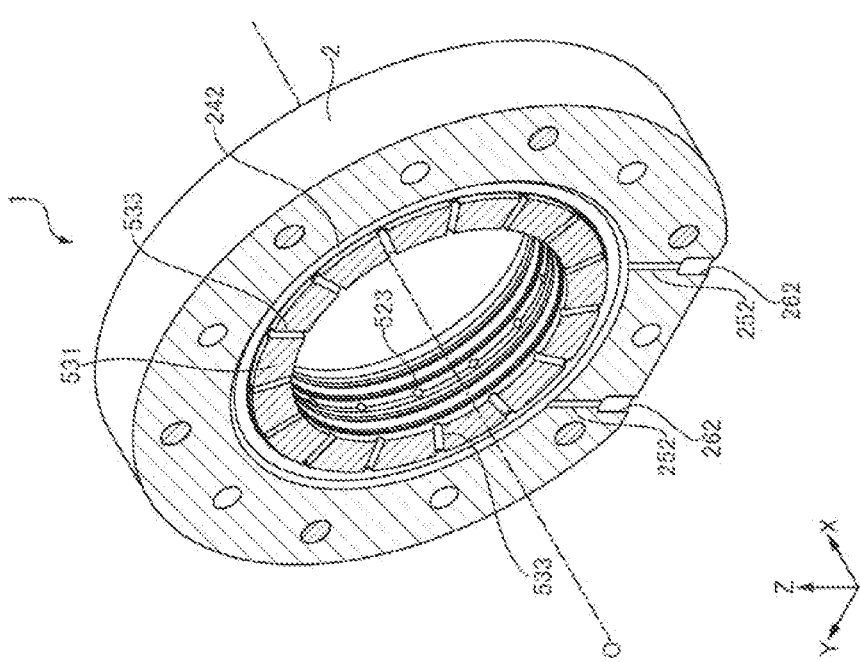
FIG. 8A is a perspective view illustrating the wiping unit of FIG. 1 taken along line B-B'.

FIG. 8A is a perspective view illustrating the wiping unit 1 of FIG. 1 taken along line B-B'. FIG. 8B is a line B-B' cross-sectional view of FIG. 8A. This line B-B' passes through the drain holes 533 of the frame 531 and the ring-shaped drain groove 242 of the housing 2. Therefore, the drain holes 533 of the frame 531 and the drain groove 242 of the housing 2 are illustrated in FIGS. 8A and 8B. Here, the drain holes 523 of the frame 521, the drain groove 241 of the housing 2, and the drain holes 543 of the frame 541 and the drain groove 243 of the housing 2 have the same configurations as those illustrated in FIGS. 8A and 8B, and therefore are not described.

The wiping unit 1 is intended to completely scrape the lubricating oil on the outer peripheral surface 201*a* of the ram 201 by the wipe member 61 of the wipe section 41 and return to the drive mechanism side. However, a very small amount of lubricating oil, which has failed to be scraped, may go over the wipe section 41 sometimes.

In order to scrape the lubricating oil having gone over the wipe section 41, the wiping unit 1 includes the wipe section 42. The lubricating oil having been scraped from the outer peripheral surface 201*a* of the ram 201 by the lip 7 of the wipe member 62 flows into the drain holes 523, and then flows into the ring-shaped drain groove 241 communicating with the drain holes 523, as illustrated in FIGS. 2A and 2B, FIGS. 4A and 4C. Then, the lubricating oil having flowed into the drain groove 241 flows through orifices 251 of the drain groove 241 and outlets 261 communicating with the orifices 251 to flow through discharge pipes (not shown) connected to the outlets 261, and therefore is discharged to the outside and consequently collected as the collected material.

In this way, the wiping unit 1 includes the drain path provided in the wipe section 42 to discharge and collect the lubricating oil scraped by the wipe member 62. The drain path includes the drain holes 523, the drain groove 241, the orifices 251, and the outlets 261.

Nevertheless, in case the lubricating oil goes over the wipe section 42, the wiping unit 1 includes the wipe section 43. By this means, the wiping unit 1 more completely scrapes the lubricating oil from the outer peripheral surface 201*a* of the ram 201 by the lip 731 of the wipe member 63.

The scraped lubricating oil stays in the groove 732 of the wipe member 63 once, and flows through the gap between the posture keeper 733 of the wipe member 63 and the outer peripheral surface 201*a* of the ram 201. After that, the lubricating oil flows into the plurality of drain holes 533, and then flows into the ring-shaped drain groove 242 communicating with the drain holes 533 as indicated by arrows T1 of FIG. 8B. Then, the lubricating oil having flowed into the drain groove 242 flows into orifices 252 provided in the drain groove 242 as illustrated in FIGS. 4A and 4B, and indicated by arrows T2 of FIG. 8B, flows from outlets 262 communicating with the orifices 252 into discharge pipes (not shown) connected to the outlets 262, is discharged to the outside and consequently collected as the collected material.

In this way, the wiping unit 1 includes the drain path provided in the wipe section 43 to discharge and collect the lubricating oil scraped by the wipe member 63. The drain path includes the drain holes 533, the drain groove 242, the orifices 252, and the outlets 262.

Meanwhile, in the housing 2, orifices may be provided in the drain groove 243, and outlets communicating with the orifices may be provided. That is, the wiping unit 1 may include the drain path to discharge and collect the lubricating oil scraped by the wipe member 64 of the wipe section 44. The drain path includes the drain holes 543, the drain groove 243, the orifices (not shown) provided in the drain groove 243, and the outlets (not shown) communicating with the orifices. Then, the discharge pipes (not shown) to discharge the lubricating oil to the outside may be connected to the outlets.

As described above, the wiping unit 1 is configured to completely scrape the lubricating oil in the wipe section 43. However, in case the lubricating oil goes over the wipe section 43, the wipe member 64 scrapes the lubricating oil in the wipe section 44. The lip 741*b* of the wipe member 64 in the wipe section 44 completely scrapes the lubricating oil on the outer peripheral surface 201*a* of the ram 201. The lubricating oil having been scraped by the lip 741*b* flows into the plurality of drain holes 543, and then flows into the ring-shaped drain groove 243 communicating with the drain holes 543. Then, the lubricating oil having flowed into the drain groove 243 flows into the orifices (not shown) provided in the drain groove 243, flows from outlets (not shown) communicating with the orifices into discharge pipes (not shown) connected to the outlets, and therefore is discharged to the outside and consequently collected as the collected material.

In this way, the wiping unit 1 may include the drain path to individually collect the lubricating oil as the collected material for each of the wipe sections 42 to 44. By this means, it is possible to detect the amount of collected (discharged) lubricating oil collected individually for each of the wipe sections 42 to 44 by sensors. The sensor may be provided for each of the wipe sections 42 to 44. Alternatively, the total amount of lubricating oil collected from the plurality of wipe sections 42 to 44 may be detected by one sensor.

The wiping unit 1 regularly (for example, per month) detects the amount of collected lubricating oil which is the collected material for each of the wipe sections 42 to 44. By this means, the worker can check the functional condition of the wiping unit 1, and determine the amount of lubricating oil to be filled, or the timing to replace the wipe members.

In addition, the wiping unit 1 may include the drain path (not shown) provided in the wipe section 41, which is configured to discharge and collect the lubricating oil scraped by the wipe member 61 and includes the drain holes, the drain groove, the orifices provided in the drain groove, and the outlets communicating with the orifices, in the same way as the drain paths of the wipe sections 42 to 44. Then, the discharge pipes (not shown) to discharge the lubricating oil to the outside may be connected to the outlets.

Lids (not shown) may be attached to the outlets of the drain path in each of the wipe sections 41 to 44 to plug the outlets with the lids. Here, for example, the outlet of the wipe section 42 is plugged with the lid, but the outlet of the wipe section 43 next to the wipe section 42 is not plugged with the lid. Accordingly, the oil pressure in the wipe section 42 in which the outlets are plugged with the lids is higher than the wipe section 43 in which the outlets are not plugged with the lids (there is difference in oil pressure).

By this means, the increased oil pressure raises the pressing force (strain force) on the wipe member 62 of the elastic ring 82 in the wipe section 42. In this way, the wiping unit 1 has the difference in oil pressure between the wipe sections 4 next to one another, and therefore it is possible to raise the pressing force (strain force) on the wipe member 6 in the wipe section 4 with the increased oil pressure. The pressing force on the wipe member 6 is increased, and therefore the pressing force of the wipe member 6 on the outer peripheral surface 201a of the ram 201 is increased. By this means, the force to scrape the lubricating oil is increased, and consequently it is possible to decrease the amount of leakage of the lubricating oil.

Here, which of the wipe sections 41 to 44 is selected to plug the outlets of its wipe section 4 may be optionally determined by selecting the wipe section 4 which is required to increase the oil pressure. In this case, the outlets of one of the wipe sections 41 to 44 may be plugged, or the outlets of more than one of the wipe sections 41 to 44 may be plugged.

Moreover, the number of the subunits 5 (the number of the corresponding wipe sections 4) is not limited to four, but other numbers are possible, and may be increased as long as the installation space of the housing 2 can be secured.

According to the invention, it is possible to provide a wiping unit capable of fully maintaining its function for a long time, and a can body maker including the wiping unit.

The invention claimed is:

1. A wiping unit for wiping a reciprocating ram of a can body maker, comprising a plurality of subunits of the wiping unit, a ring-shaped housing, and a ring-shaped cap wherein:
each subunit of the plurality of subunits including a ring-shaped wipe member having at least one lip to press an outer peripheral surface of the reciprocating ram and at least one elastic ring disposed on an outer circumference of the ring-shaped wipe member and configured to press the at least one lip on the outer peripheral surface of the reciprocating ram,
wherein:
the ring-shaped wipe member is made of rigid resin,
the plurality of subunits are arranged along a central axis direction of the wiping unit,
a drain path is provided between a first said ring-shaped wipe member of a first subunit of the plurality of subunits and a second said ring-shaped wipe member of a second subunit of the plurality of subunits next to the first subunit to discharge collected materials collected by the wipe member,
each of the subunits includes a ring-shaped frame having a first storage stage configured to store the first said ring-shaped wipe member and at least a first said elastic ring, inserted from one side in a direction of the central axis of the wiping unit,
the ring-shaped housing includes a frame storage configured to store each said ring-shaped frame of the plurality of subunits in a stacked manner,
the ring-shaped cap is attached to the ring-shaped housing and configured to close the frame storage in which each said ring-shaped frame is stored with the ring shaped cap,
the drain path includes drain holes provided in the ring-shaped frame of the second subunit, radially with respect to the central axis of the wiping unit, and
at least one ring-shaped drain groove is provided inside the frame storage in the ring-shaped housing and configured to communicate with the drain holes.

2. The wiping unit according to claim 1, wherein the rigid resin is rigid polyurethane.

3. The wiping unit according to claim 1, wherein
the ring-shaped housing includes
a second storage stage configured to store the second said wipe member and the at least second said elastic ring, inserted from the one side of the direction of the central axis of the wiping unit.

4. The can body maker comprising the wiping unit according to claim 1, wherein the wiping unit is disposed on a boundary between a side where a water-soluble lubricant for molding a can is supplied to an outer peripheral surface of the reciprocating ram and a drive mechanism side where reciprocating motion of the reciprocating ram is driven by suppling lubricating oil.

5. The can body maker according to claim 4, wherein a third subunit of the plurality of subunits, located in the wiping unit on the side where the water-soluble lubricant is supplied, includes:
a third said ring-shaped wipe member including a plurality of lips; and
a plurality of said elastic rings to press the plurality of lips on the reciprocating ram, respectively.

* * * * *